United States Patent
Wang

(10) Patent No.: US 10,320,577 B2
(45) Date of Patent: Jun. 11, 2019

(54) DISREGARDING INPUT IN WAKE-ON-LAN BOOT

(71) Applicant: HEWLETT PACKARD DEVELOPMENT COMPANY, L.P., Houston, TX (US)

(72) Inventor: Chin-Yu Wang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 162 days.

(21) Appl. No.: 15/516,332

(22) PCT Filed: Oct. 27, 2014

(86) PCT No.: PCT/US2014/062408
§ 371 (c)(1),
(2) Date: Mar. 31, 2017

(87) PCT Pub. No.: WO2016/068848
PCT Pub. Date: May 6, 2016

(65) Prior Publication Data
US 2017/0310492 A1    Oct. 26, 2017

(51) Int. Cl.
*H04L 12/12* (2006.01)
*G06F 9/44* (2018.01)
*G06F 9/4401* (2018.01)

(52) U.S. Cl.
CPC ............ *H04L 12/12* (2013.01); *G06F 9/4401* (2013.01); *G06F 9/4406* (2013.01); *G06F 9/4411* (2013.01); *Y02D 50/40* (2018.01)

(58) Field of Classification Search
CPC ..... H04L 12/12; G06F 9/4401; G06F 9/4406; G06F 9/4411
See application file for complete search history.

(56) References Cited

U.S. PATENT DOCUMENTS

| 6,421,782 B1 * | 7/2002 | Yanagisawa | .......... G06F 1/1632 726/4 |
| 7,082,129 B2 * | 7/2006 | Cromer | ................. G06F 1/3209 370/389 |

(Continued)

FOREIGN PATENT DOCUMENTS

| CN | 102088357 | 6/2011 |
| KR | 10-2006003488 | 1/2006 |

(Continued)

OTHER PUBLICATIONS

System Area Manager: Remote Management, 2014, pp. 1-37, SyAM Software, Inc., Available at: <https://www.syamsoftware.com/files/Remote%20Management%20(System%20Area%20Manager).pdf>.

*Primary Examiner* — Stefan Stoynov
(74) *Attorney, Agent, or Firm* — HP Inc. Patent Department

(57) ABSTRACT

In one example, a method for inhibiting input at a remotely-booted computer. A wake-on-LAN signal is received at the computer from a network while the computer is in a low-power state. A boot function of the computer sets an indicator indicative of a wake-on-LAN condition, the indicator accessible by an operating system of the computer. The operating system is loaded, including a filter driver for an input device of the computer. The filter driver is to intercept input from the device to a function driver for the device. When the indicator is set, input received from the input device is disregarded.

15 Claims, 5 Drawing Sheets

(56) References Cited

U.S. PATENT DOCUMENTS

| | | |
|---|---|---|
| 8,214,914 B2 | 7/2012 | Eldar et al. |
| 8,799,652 B2 | 8/2014 | Falk et al. |
| 2006/0026684 A1* | 2/2006 | Harvey .................. G06F 21/53 726/23 |
| 2007/0192579 A1* | 8/2007 | Lee ........................ H04L 12/12 713/1 |
| 2009/0210519 A1 | 8/2009 | Zill et al. |
| 2012/0170592 A1 | 7/2012 | Dudkowski et al. |
| 2012/0210112 A1 | 8/2012 | Suganami |

FOREIGN PATENT DOCUMENTS

| | | |
|---|---|---|
| KR | 10-20090011293 | 2/2009 |
| TW | 201342033 | 10/2013 |
| TW | 201406098 | 2/2014 |
| TW | 201439738 | 10/2014 |
| WO | WO-2012/147170 A1 | 11/2012 |

* cited by examiner

DISREGARDING INPUT IN WAKE-ON-LAN BOOT

CROSS-REFERENCE TO RELATED APPLICATION

This application is a U.S. National Stage Application of and claims priority to International Patent Application No. PCT/US2014/062408, filed on Oct. 27, 2014, and entitled "DISREGARDING INPUT IN WAKE-ON-LAN BOOT," which is hereby incorporated by reference in its entirety.

BACKGROUND

Computer systems with network capability often support the ability to be awakened from a low-power state in response to receipt of a wake-on-LAN signal from the network at the computer. Awakening from certain low-power states, such as those often referred to as "hibernate" or "soft-off", involves a boot of the computer system. Booting the computer often includes a processor executing machine-readable instructions stored in a non-volatile firmware component (often called the "BIOS") of the computer in order to load an operating system of the computer into the computer's volatile memory.

DETAILED DESCRIPTION

Figure 1:
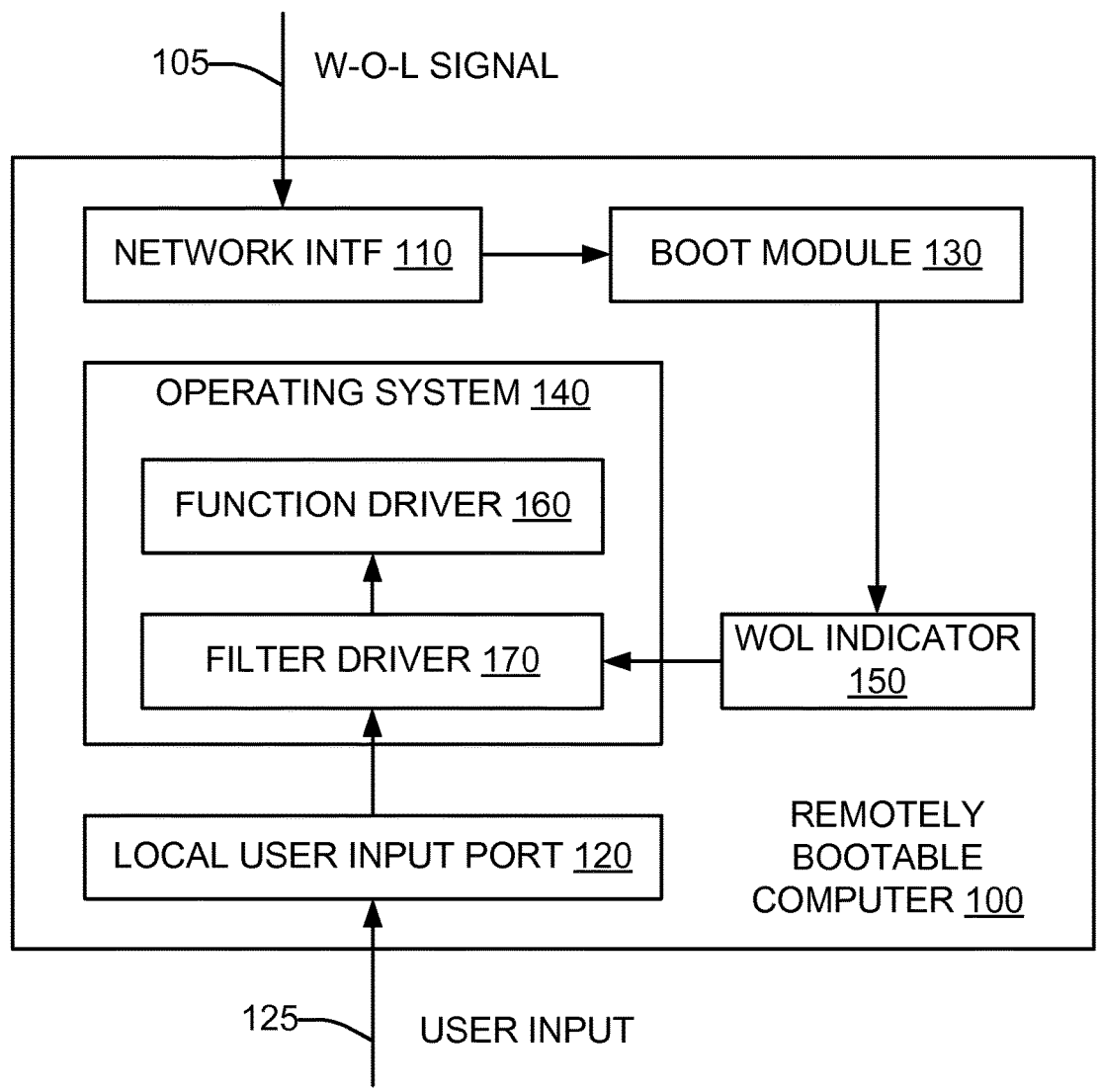
FIG. 1 is a schematic block diagram of a remotely-bootable computer in accordance with an example of the present disclosure.

A network is often used to interconnect a large number of computers, such as those which belong to a particular organization. These computers may be located at geographically separated locations. Often times an organization's computers are remotely managed by an administrator, who may be part of an information technology (IT) group. During remote management, control of the remote computer may be taken over by a remote console operated by the administrator. In such situations, commands are issued to the computer by the administrator using the remote console, rather than from a local user input device of the computer, such as its keyboard or mouse.

Many times it is convenient for the user of the computer to have its remote management or administration performed when the user is not working, such as during non-working hours. In order to conserve power when the computer is not in use, the user may put the computer in a low-power state before leaving the worksite. In the low-power state, the computer can be awakened a wake-on-LAN signal issued by the administrator at the remote console and received at the computer's network adapter. In some examples, the wake-on-LAN signal is a "magic packet" broadcast frame sent on the data link layer (OSI level 2) to all computers on a network, but responded to by the computer whose 48-bit MAC address corresponds to that included in the magic packet.

For power management, in one example, many such computers implement in their chipsets a standard known as ACPI (Advanced Configuration and Power Interface). ACPI brings power management under control of the computer's operating system, rather than the BIOS. Most of the ACPI functionality is implemented using tables and registers accessible by the operating system. ACPI defines several different low-power states for a computer. For example, in state S3, known as Sleep, Standby, or Suspend to RAM, power is maintained to the volatile memory of the computer and the circuitry of the network adapter that receives the wake-on-LAN signal, but the processor is turned off. The computer can be quickly restored from state S3 to its previous operating condition when reawakened, because the volatile memory contents remain in place. In state S4, known as Hibernate, or Suspend to Disk, all content of the volatile memory is saved to a non-volatile memory such as a hard disk, and the volatile memory is then powered off along with the processor, while power is maintained to the network adapter circuitry. The computer can be restored to its previous operating condition when reawakened, by performing a partial boot that includes reloading into volatile memory its previous contents, which were stored in non-volatile memory during hibernation. In state S5, known as Soft Off, power is maintained to the power button of the computer and the circuitry of the network adapter that receives the wake-on-LAN signal, but the contents of volatile memory are not retained. When reawakened by the wake-on-LAN signal, a full boot of the computer is performed; the previous operating condition of the computer was not save and thus is not restored. For ACPI, reawakening from low-power states S4 and S5 both involve a boot process.

A security breach may occur in many computers with remote awakening from low-power states due to the implementation of boot module or function in the computer's firmware. If an unauthorized person is nearby the computer after it has been remotely awakened and placed in administrator mode (a higher level of user capability that allows changing system configuration, updating the computer firmware, and turning on I/O ports inaccessible in other modes), that person may access the computer using its local user input devices with the same capabilities as the administrator. For example, the unauthorized user could access sensitive information stored on the computer, or install viruses or other malware on the computer. Normally the computer firmware requires a logon password to obtain administrator capability. However, in many cases the firmware expects the logon procedure to be performed from the local user input devices, and does not have the capability to perform the logon procedure from a remote console in a wake-on-LAN situation. Because the wake-on-LAN situation anticipates that there will be no authorized user nearby the computer when it is awakened, the logon dialogue is disabled in the wake-on-LAN operation. This creates the security issue.

One solution might be to modify the computer's firmware to redirect the user input functions to the remote console in the wake-on-LAN situation. This would allow the firmware to perform at boot time a logon user-authentication procedure with the administrator at the remote console. However, this solution undesirably adds complexity and cost to the computer. In order to implement such a redirect function, in one example the computer would use a different, custom, and more complex keyboard controller, network controller, and chipset, and a larger non-volatile memory sufficient to store a remote receiver module. While the extra cost and complexity may be acceptable in certain higher-price, special-purpose computers such as those intended specifically for use with a server, including them in computers designed for more general usage would put these computers at a significant competitive price disadvantage versus general usage computers which omit such remote console boot support.

Referring now to the drawings, there is illustrated an example of a computer constructed in accordance with the present disclosure which can inhibit input from local user input devices of the computer when the computer is remotely booted via a wake-on-LAN signal received over a network. A boot function of the computer sets an indicator indicative of the wake-on-LAN condition which is accessible by the operating system after it is loaded. A filter driver can intercept input from a local user input device, and disregard this input when the indicator is set. In this way, the computer can prevent the security breach of an unauthorized local user gaining administrator access to the computer when the computer is remotely booted. These enhanced capabilities can be added to a general usage computer at little or no cost, with no change to the keyboard controller, network controller, and chipset, and in many cases no increase in the memory size of the non-volatile memory. As such, the present disclosure represents a significant improvement in the function of the computer.

Considering now a remotely-bootable computer, and with reference to FIG. 1, a computer 100 includes a network interface 110 to receive a wake-on-LAN signal 105 while the computer 100 is in a low-power state. The network interface 110 may be, for example, a network adapter or network card. The wake-on-LAN signal 105 may be received another device on a network to which the computer 100 is connected in a wired or wireless manner. The network may be, for example, the Internet.

The computer 100 also includes a local user input port 120. The local user input port 120 is to receive input 125 from a human user via an input device connected to the interface. The port 120 may be connected to, among other devices, a character entry device such as for example a keyboard, and/or a pointing device such as for example a mouse or trackball. The input port 120 may be part of, for example, a USB interface, an IBM-compatible keyboard interface, and/or or an IBM-compatible PS/2 interface. Some interfaces, such as a USB interface, may have separate ports for different devices. Other interfaces may have a single port. The term "local" means that the user input devices are positioned nearby the computer. In various examples, the local user input devices are positioned within about 10 feet of the computer 100; or in the same room as the computer 100; or within a distance supported by the interface of the input port 120.

The computer 100 further includes a boot module 130. The boot module 130 initializes the computer 100 when it is powered on, or awakened from a low-power state. In one example the boot module 130 is firmware stored in a non-volatile memory of the computer 100. In one example, the boot module 130 is a component of an IBM PC-compatible legacy BIOS, or of Unified Extensible Firmware Interface (UEFI) firmware. The boot module 130 may also load, or initiate the loading of, an operating system 140 for the computer 100 into volatile memory (not shown) of the computer 100. When the computer 100 is awakened by receipt of the wake-on-LAN signal 105, the boot module 130 sets a wake-on-LAN indicator 150 in response. In one example, the wake-on-LAN indicator 150 may be a run-time variable stored in a non-volatile memory (not shown) of the computer 100. In another example, the wake-on-LAN indicator 150 may be a virtual device (pseudo-device) in an ACPI table.

The boot module 130 may further load, or initiate the loading of, a function driver 160 associated with the local user input device and a filter driver 170 associated with the function driver 160. The function driver 160 conveys user input that it receives to the operating system 140. The filter driver 170 is inserted logically between the function driver 160 and the input port 120 so as to intercept user input 125 received at the input port 120 from the input device. The wake-on-LAN indicator 150 is accessible generally to the operating system 140 after it has been loaded, and to the filter driver 170 in particular. The filter driver 170 disregards the user input 125 when the wake-on-LAN indicator 150 is set. When the wake-on-LAN indicator 150 is not set, the filter driver 170 passes the user input 125 to the function driver 160. In some examples, the drivers 160, 170 may be part of the operating system 140.

Figure 2:
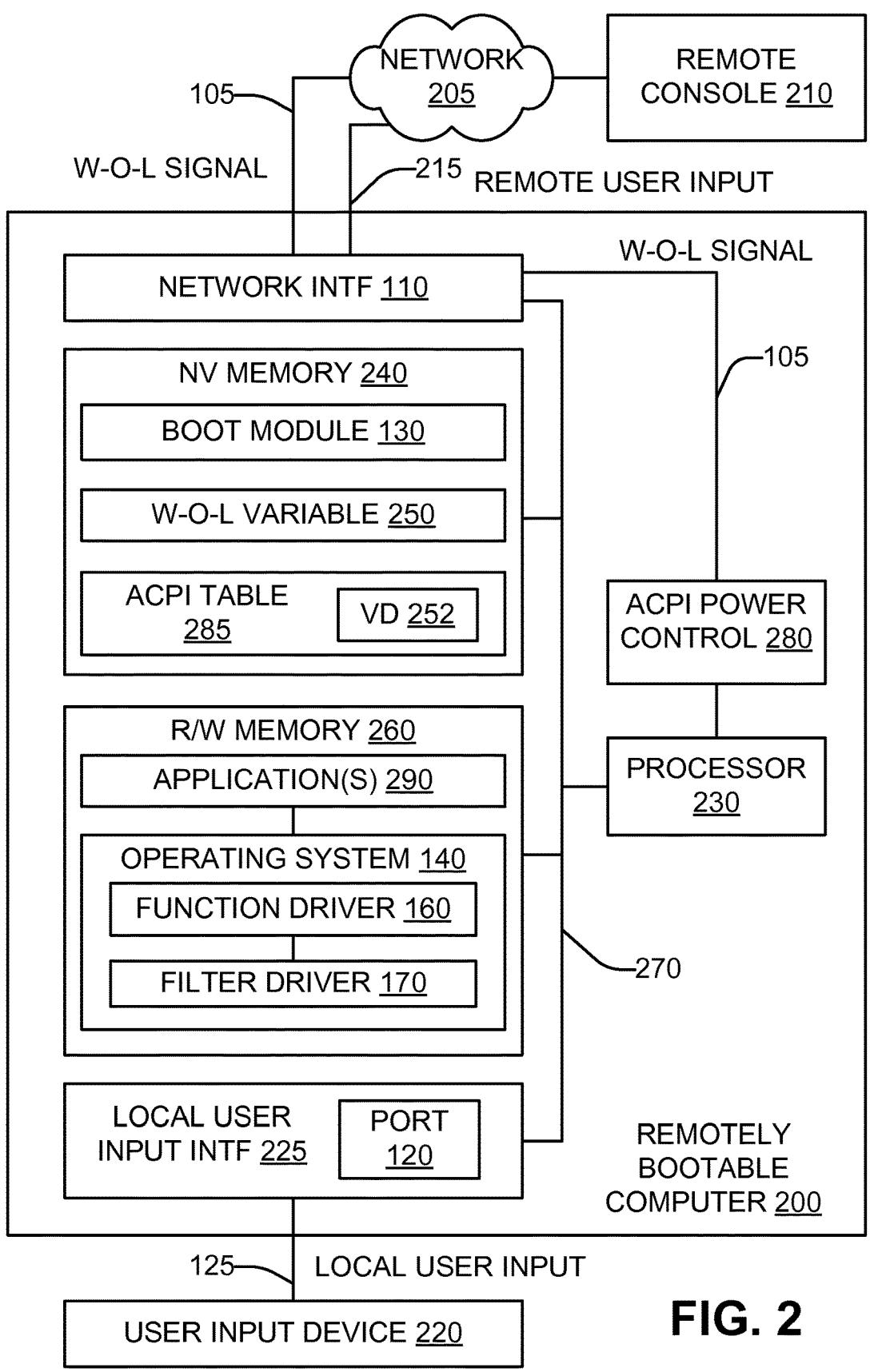
FIG. 2 is a schematic block diagram of another remotely-bootable computer in accordance with an example of the present disclosure.

Considering now another remotely-bootable computer, and with reference to FIG. 2, a computer 200 includes many of the elements of computer 100, including a network interface 110, a local user input port 120, a boot module 130, an operating system 140, a function driver 160, and a filter driver 170. The port 120 may be part of a local user input interface 225. A wake-on-LAN signal 105 may be received over a network 205 from a remote console 210. The remote console 210 may be controlled or operated by an administrator of the computer 200 who may provide remote user input 215 to the computer 200 as part of administering the computer 200. The term "remote" means that the console 210 is not positioned nearby the computer, and is at a greater distance from the computer 200 than a local user input device 220 communicatively coupled to the local user input port 120. In various examples, the remote console 210 is positioned in a different room, floor, building, or geographic area from the computer 100; or at a distance greater than that supported by the technology of the local input interface 225. The administrator may supply remote user input 215 to the computer 200 via the remote console 210.

The computer 200 includes a processor 230 that accesses a non-transitory computer-readable medium having an executable program stored thereon, and that executes instructions of the program. The computer 200 includes a non-volatile memory 240, and a read/write memory 260. The read/write memory 260, in many examples, is a volatile memory that retains its contents while power is continuously applied to it, such as occurs during normal operation of the computer 200 and in the ACPI low-power S3 and S4 states. A bus 270 communicatively couples the processor 230 to the memories 240, 260, the network interface 110, and the local user input interface 225. The bus 270 may include an interconnected set of different physical busses, bus controllers, and related circuitry.

The firmware components of the computer 200, including the boot module 130, are stored in the non-volatile memory 240, which retains its content when power is removed from it.

The read-write memory 260 includes the operating system 140, the function driver 160, and the filter driver 170. In many examples, these software components are loaded into the memory 260 as initiated by the boot module 130. Other modules stored in the non-volatile memory 240, such as an operating system loader (not shown), may participate in the loading of the operating system 140. During operation, one or more application programs 290 may be loaded into the memory 260 (from, for example, a disk) by the operating system 140 and/or executed under control of the operating system 140.

The computer 200 includes an ACPI power control module 280. The module 280 manages the power states of the computer 200. When a wake-on-LAN signal 105 is received at the computer 200 when it is in a low-power state, the signal 105 is provided from the network interface 110 to the ACPI power control module 280. The module 280 then initiates the application of power to those components of the computer 200 which were depowered in the low-power state, and signals the processor 230 to begin executing the boot module 130. In some examples, the module 280 issues a reset to the processor 230 which causes the processor 230 to begin executing instructions at a specific predetermined memory address.

As discussed with reference to FIG. 1, the boot module 130 sets a wake-on-LAN indicator in response to the computer being awakened by receipt of the wake-on-LAN signal 105. In one example, the wake-on-LAN indicator may be a wake-on-LAN variable 250 stored in the non-volatile memory 240. In another example, the wake-on-LAN indicator may be a virtual device 252 in an ACPI table 285 in memory 240. In addition, when awakened by receipt of the wake-on-LAN signal 105, the computer 200 omits performing any user authentication process conducted between the computer 200 and the local user input device 220 when the computer 200 is booted locally, such as by the user pressing a power button of the computer 200.

Figure 3:
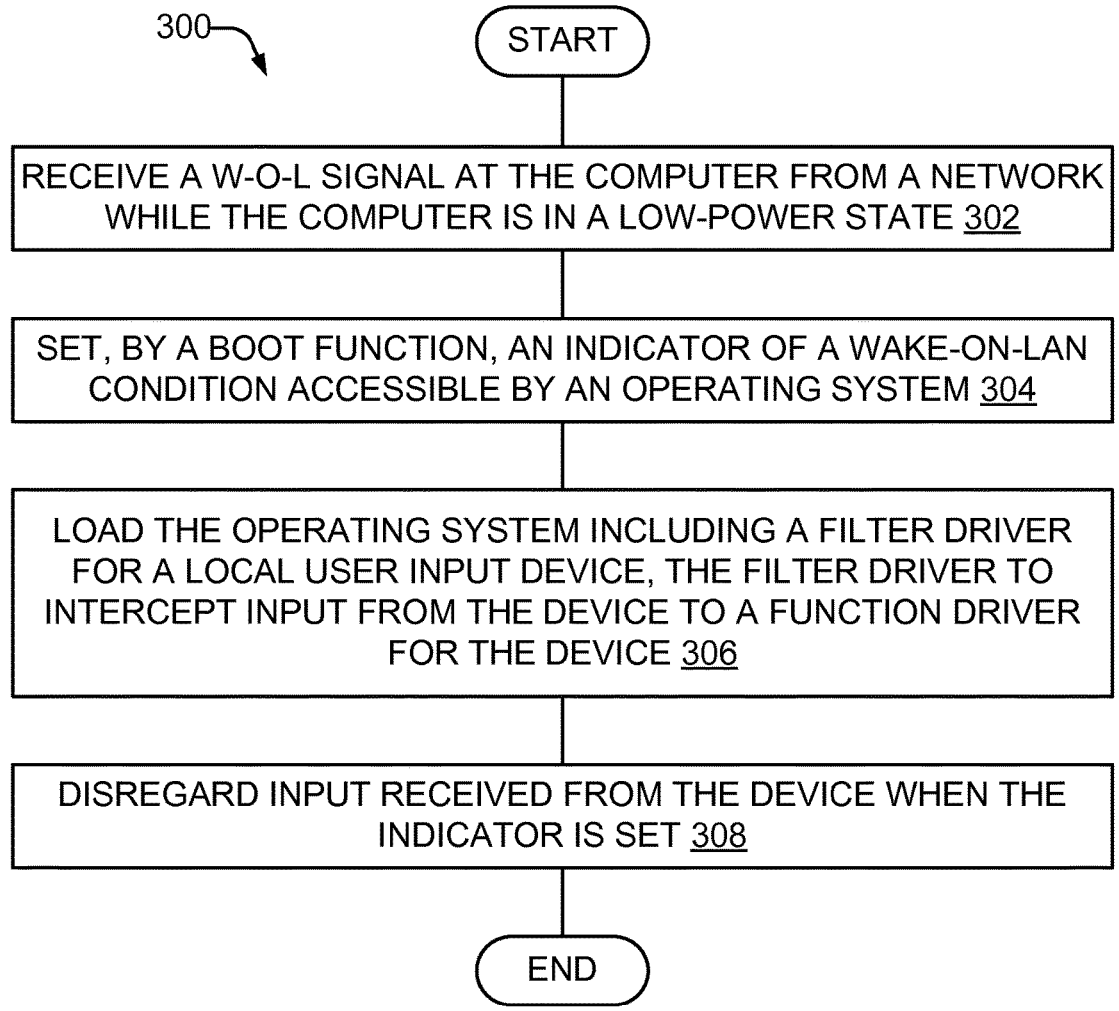
FIG. 3 is a flowchart according in accordance with an example of the present disclosure of a method for inhibiting local input at a remotely-booted computer.

Consider now, with reference to FIG. 3, a method for inhibiting local input at a remotely-booted computer. The flowchart of FIG. 3 may be considered as steps in a method implemented in the remotely-booted computer. Alternatively, the flowchart of FIG. 3 may be considered as a flowchart of the remotely-booted computer. A method 300 begins at 302 by receiving a wake-on-LAN signal at the computer from a network while the computer is in a low-power state. At 304, a boot function of the computer sets a wake-on-LAN indicator indicative of a wake-on-LAN condition. The indicator is accessible by an operating system of the computer. The indicator may be stored by the boot function in non-volatile memory, and/or a virtual wake-on-LAN device may be created in an ACPI table by the boot function. At 306, an operating system is loaded. This includes loading a filter driver for a local user input device of the computer. The filter driver is operable to intercept input from the local user input device which is intended for a function driver associated with the local user input device. The filter driver makes a determination whether or not to pass the input received from the local user input device to the function driver. At 308, the input received from the local user input device is disregarded when the wake-on-LAN indicator is set (which indicates that the computer has been remotely booted via the wake-on-LAN signal). The function driver makes the determination, based on the wake-on-LAN indicator, whether or not the input is to be disregarded. If the wake-on-LAN indicator is not set, the function driver passes the received input from the local input device to the function driver.

Figure 4:
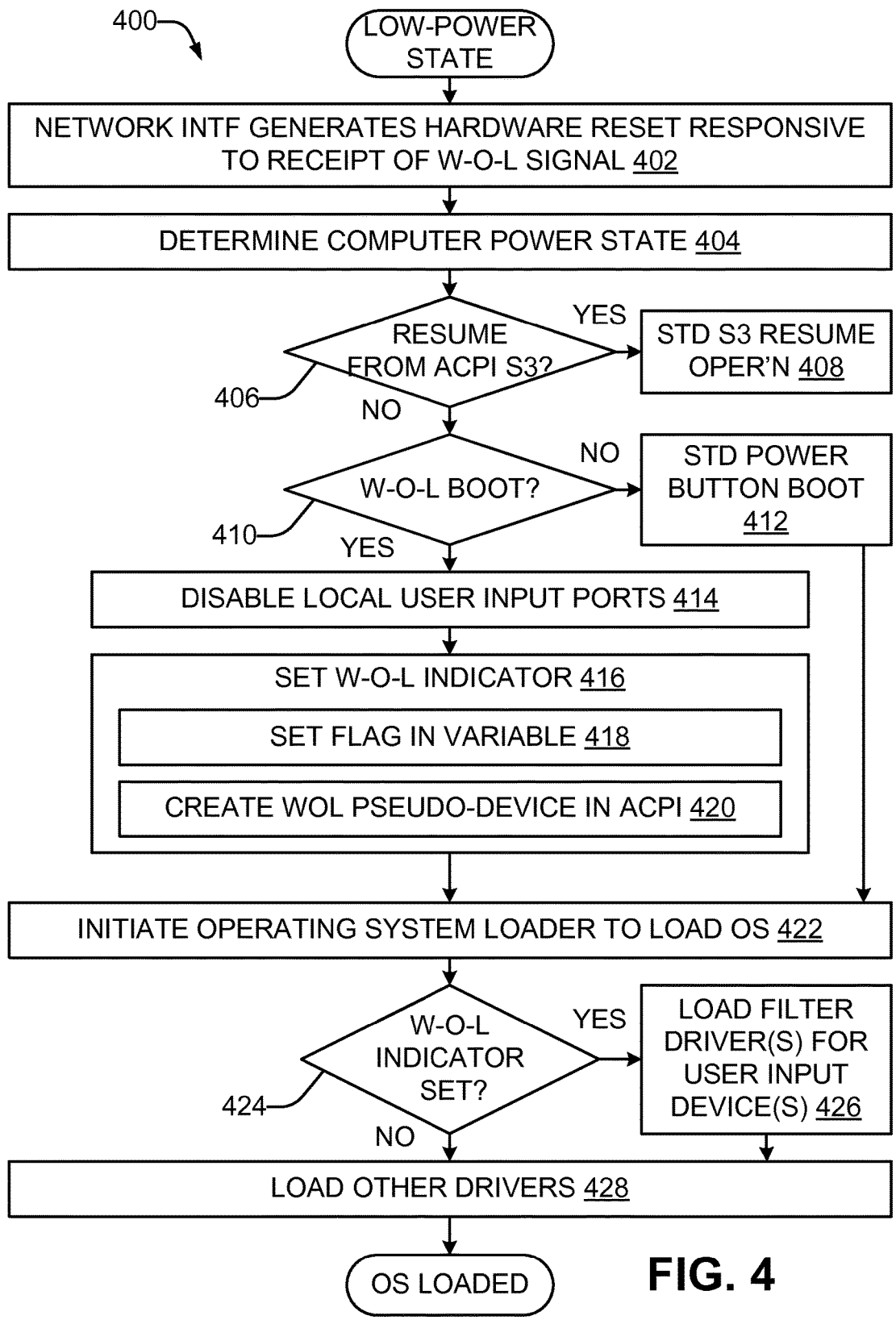
FIG. 4 is a flowchart according in accordance with an example of the present disclosure of another method for inhibiting local input at a remotely-booted computer.

Consider now, with reference to FIG. 4, another method for inhibiting local input at a remotely-booted computer. The flowchart of FIG. 4 may be considered as steps in a method implemented in the remotely-booted computer. Alternatively, the flowchart of FIG. 4 may be considered as a flowchart of the remotely-booted computer. The computer may be the computer 100, 200. A method 400 begins with the computer in a low-power state. At 402, a network interface of the computer receives a wake-on-LAN signal from the network, and generates a hardware reset signal to the processor in response. The network interface may also communicate the wake-on-LAN signal to a power control module to initiate the application of power to those components of the computer which were depowered in the low-power state. At 404, the computer power state is determined. If the computer is in the S3 ("sleep") low-power state ("Yes" branch of 406), then at 408 the computer's standard S3 resume operation is performed. Because power is maintained to the volatile memory of the computer in the S3 low-power state, the computer can be reawakened from state S3 to its previous operating condition without performing a boot function to reload the operating system.

If the computer is not in the S3 ("sleep") low-power state ("No" branch of 406), then at 410 it is determined if the computer is being reawakened from the low-power state by a wake-on-LAN signal. If not ("No" branch of 410), then at 412 the computer's standard power button boot process is performed. This is done because the computer is being reawakened from the low-power state as the result of an action taken local to the computer, such as pressing the computer's power button, for example. In this case, it is presumed that a user is nearby the computer, and the computer's standard user authentication process on boot is performed using the local user input device. After block 412, the method continues at block 422, without setting a wake-on-LAN indicator.

If the computer is reawakened from the low-power state by a wake-on-LAN signal ("Yes" branch of 410), then at 414 the local user input port(s) of the computer are disabled. Disabling these ports prevents the computer from receiving local user input, potentially from an unauthorized user nearby the computer, during the boot process (i.e. before the operating system has been loaded). At 416, a wake-on-LAN indicator is set. In one example, at 418, the wake-on-LAN indicator is a run-time variable or flag stored in non-volatile memory of the computer. In another example, at 420, the wake-on-LAN indicator is a virtual wake-on-LAN device created in an ACPI table of the computer; if this virtual device is present in the table, then the awakening is due to a wake-on-LAN signal. While using a run-time variable is a more straightforward technique, in some examples the run-time variable service by which the operating system can access such variables may be blocked for security reasons and the ACPI virtual device technique used instead.

At 422, loading of an operating system for the computer is initiated. In some examples, the loading is performed by a boot function built into firmware of the computer. In other examples, the loading is performed by an operating system loader which is loaded into memory of the computer by the boot function.

At 424, it is determined whether a wake-on-LAN indicator is set. This may be done by reading the wake-on-LAN run-time variable, or determining whether a virtual wake-on-LAN device exists in the ACPI table. If so ("Yes" branch of 424), then at 426 a filter driver is loaded for the local user device(s) connectable to the input interface. If there are multiple local user input devices, each with a different function driver, a different filter driver may be loaded for each device as well. The other drivers (including the function driver(s) for the local user input devices) are then loaded at 428, and the loading of the operating system completes.

If at 424 the wake-on-LAN indicator is not set ("No" branch of 424), then the method branches to 428 to load the drivers. Where the computer is being awakened from the ACPI S4 ("hibernate") state, block 428 may also reload into volatile memory data representing the prior contents of the memory 260 at the time when the computer entered the hibernate state. These prior contents may have been stored as a configuration file in a non-volatile memory such as a hard disk.

Although the local user input port(s) of the computer are disabled by the boot function at 414, they may be reenabled in conjunction with the loading of the operating system, so that the local user input devices can provide input to the computer once the boot process has been completed. As a result, after the operating system is loaded, a filter driver is used to inhibit local user input in the wake-on-LAN case.

Figure 5:
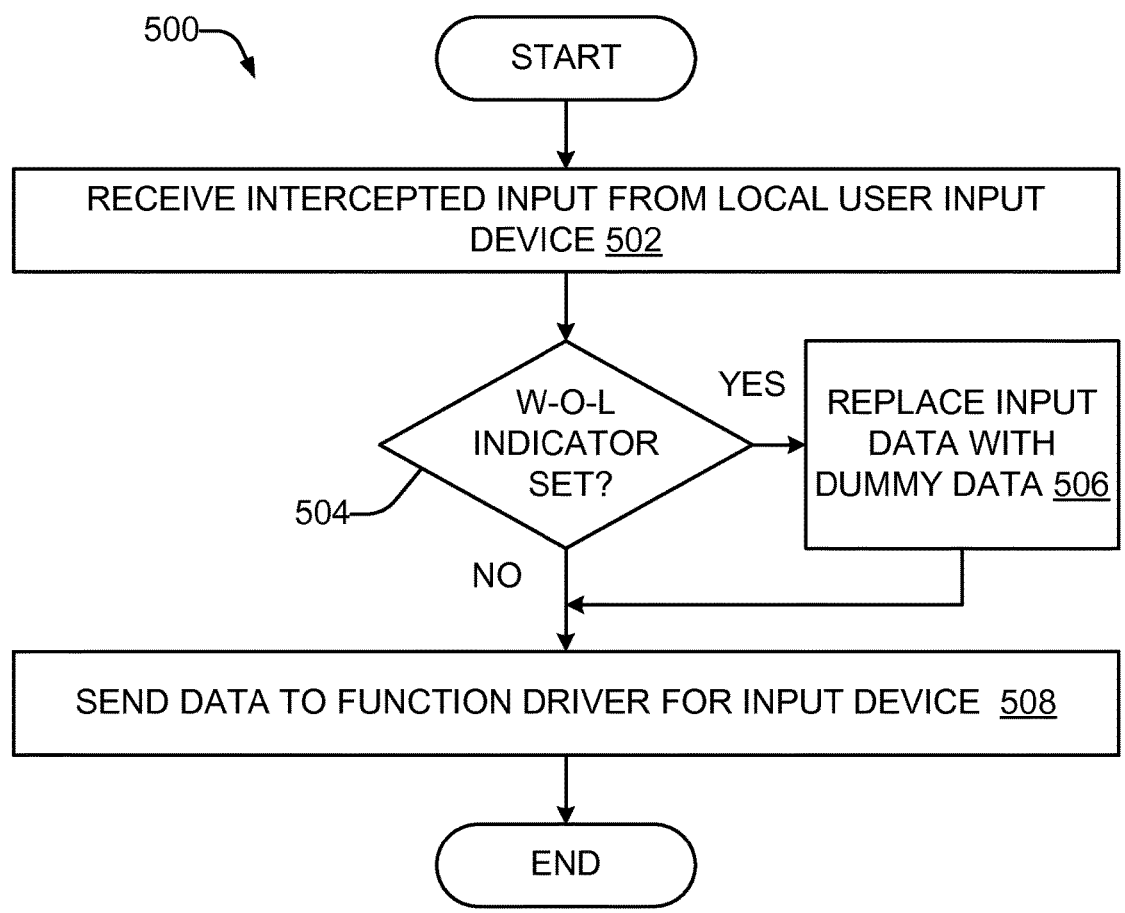
FIG. 5 is a flowchart according in accordance with an example of the present disclosure of a method for intercepting and disregarding local user input at a remotely-booted computer.

Consider now, with reference to FIG. 5, a method for intercepting and disregarding input from a local user input device of a remotely-booted computer. The flowchart of FIG. 5 may be considered as steps in a method implemented in the remotely-bootable computer. Alternatively, the flowchart of FIG. 4 may be considered as a flowchart of a portion of the remotely-bootable computer. The computer may be the computer 100, 200. The method 500 may be a lower-level example of block 308 (FIG. 3). In another example, the method 500 may be performed after the method 400 has been performed and the operating system of the computer has been loaded. In some examples, the method 500 is performed by a filter driver of the computer.

The method 500 begins, at 502, by receiving the input from the local user input device. The input is obtained by intercepting it after it has been received by the local user input interface of the computer but before it has been communicated to the function driver for the local user input device. At 504, it is determined whether a wake-on-LAN indicator is set. This may be done by reading the wake-on-LAN run-time variable, or determining whether a virtual wake-on-LAN device exists in the ACPI table. If not ("No" branch of 504), then at 508 the input from the local user input device is sent to the function driver for the local user input device. If so ("Yes" branch of 504), then at 506 the input is replaced with a dummy message. In one example, the dummy message includes a header-tail packet with a blank payload. At 508 the dummy message is sent to the function driver for the local user input device. In some examples, a "success" completion status is also reported to the function driver at 508.

In some examples, one or more blocks or steps discussed herein are automated. In other words, apparatus, systems, and methods occur automatically. As defined herein and in the appended claims, the terms "automated" or "automatically" (and like variations thereof) shall be broadly understood to mean controlled operation of an apparatus, system, and/or process using computers and/or mechanical/electrical devices without the necessity of human intervention, observation, effort and/or decision.

From the foregoing it will be appreciated that the computer and methods provided by the present disclosure represent a significant advance in the art. Although several specific examples have been described and illustrated, the disclosure is not limited to the specific methods, forms, or arrangements of parts so described and illustrated. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Unless otherwise specified, steps of a method claim need not be performed in the order specified. Similarly, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the disclosed examples. Further, methods or steps discussed within different figures can be added to or exchanged with methods or steps in other figures. Further yet, specific numerical data values (such as specific quantities, numbers, categories, etc.) or other specific information should be interpreted as illustrative for discussing the examples. Such specific information is not provided to limit examples. The disclosure is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements. Where the claims recite "having", the term should be understood to mean "comprising".

What is claimed is:

1. A processor-implemented method for inhibiting local input at a remotely-booted computer, comprising:
   receiving a wake-on-LAN signal at the computer from a network while the computer is in a low-power state;
   setting an indicator indicative of a wake-on-LAN condition and accessible by an operating system of the computer;
   loading the operating system including a filter driver for a local user input device of the computer, the filter driver to intercept input from the device to a function driver for the device; and
   disregarding input received from the device when the indicator is set.

2. The method of claim 1, comprising:
   disabling, by a boot function, the local input device before the loading, wherein the local input device is subsequently enabled by the operating system.

3. The method of claim 1, wherein the setting comprises a boot function storing the indicator in non-volatile memory.

4. The method of claim 1, wherein the setting comprises creating a virtual wake-on-LAN device in an Advanced Configuration and Power Interface (ACPI) table.

5. The method of claim 1, wherein the disregarding comprises the filter driver
   receiving the input,
   replacing the input with a dummy message, and
   sending the dummy message to the function driver.

6. The method of claim 5, where the sending comprises sending a successful completion status to the function driver.

7. The method of claim 1, wherein the computer lacks capability to receive user authentication from the network prior to loading the operating system.

8. A remotely-bootable computing system, comprising:
   a network interface to receive a wake-on-LAN signal while the computers in a low-power state;
   a boot module to set a wake-on-LAN indicator responsive to the signal;
   an input port to connect a user input device;
   an input device function driver to convey user input from the input device to an operating system; and
   a filter driver associated with the function driver and inserted between the function driver and the input port to intercept input from the input device and to disregard the input when the indicator is set.

9. The computing system of claim 8, wherein the boot module is further to initiate loading of the operating system, the input device function driver, and the filter driver into a memory of the computer.

10. The computing system of claim 8, wherein the filter driver is further to pass the input to the function driver when the indicator is not set.

11. The computing system of claim 8, wherein the indicator is an ACPI virtual device.

12. The computing system of claim 8 wherein, when the indicator is set, the filter driver is further to replace the input with a dummy message, and send the dummy message to the function driver.

13. A non-transitory computer-readable medium having an executable program stored thereon, wherein the program instructs a processor to:
   determine that a boot of the computer resulted from a wake-on-LAN signal received when the computer is in a low-power state;
   set an indicator indicative of a wake-on-LAN condition accessible by an operating system;
   load the operating system;
   load a function driver for a local user input device;
   insert between the function driver and the device a filter driver to intercept input from the device; and
   disregard input from the device received at the filter driver when the indicator is set.

14. The non-transitory computer-readable medium of claim 13, wherein the program further instructs the processor to:
   disable the local input device prior to loading the operating system; and
   enable input from the local input device after the filter driver is inserted.

15. The non-transitory computer-readable medium of claim 13, wherein the low-power state comprises the ACPI S4 state or S5 state.

* * * * *

UNITED STATES PATENT AND TRADEMARK OFFICE
CERTIFICATE OF CORRECTION

PATENT NO. : 10,320,577 B2  
APPLICATION NO. : 15/516332  
DATED : June 11, 2019  
INVENTOR(S) : Chin-Yu Wang et al.

Page 1 of 1

It is certified that error appears in the above-identified patent and that said Letters Patent is hereby corrected as shown below:

In the Claims

In Column 8, Line 60, Claim 8, delete "computers" and insert -- computer is --, therefor.

Signed and Sealed this
Twenty-ninth Day of October, 2019

Andrei Iancu
*Director of the United States Patent and Trademark Office*